(12) United States Patent
Takemoto

(10) Patent No.: US 6,687,343 B2
(45) Date of Patent: Feb. 3, 2004

(54) INTERNET COMMUNICATION CONTROL APPARATUS AND COMMUNICATION TERMINAL CALLING METHOD

(75) Inventor: Yuuji Takemoto, Tokyo (JP)

(73) Assignee: Panasonic Communications Co., Ltd., Tokyo (JP)

( * ) Notice: Subject to any disclaimer, the term of this patent is extended or adjusted under 35 U.S.C. 154(b) by 112 days.

(21) Appl. No.: 10/119,773

(22) Filed: Apr. 11, 2002

(65) Prior Publication Data

US 2003/0021399 A1 Jan. 30, 2003

(30) Foreign Application Priority Data

Jun. 29, 2001 (JP) .......................................... 2001-198437

(51) Int. Cl.⁷ ............................................. H04M 11/00
(52) U.S. Cl. ................. 379/93.05; 379/90.01; 379/179; 379/373.01; 370/352
(58) Field of Search ................ 379/90.01, 93.01, 379/93.05–93.07, 93.14, 100.12, 100.14, 164, 171–173, 179, 252, 372, 373.01, 418; 370/352, 392

(56) References Cited

U.S. PATENT DOCUMENTS

| | | | | |
|---|---|---|---|---|
| 4,435,803 A | * | 3/1984 | Das et al. | 370/228 |
| 5,103,448 A | * | 4/1992 | Barnes et al. | 370/280 |
| 5,596,631 A | * | 1/1997 | Chen | 379/177 |

FOREIGN PATENT DOCUMENTS

| | | | |
|---|---|---|---|
| JP | 58-117760 | * | 7/1983 |
| JP | 3133297 | | 8/2000 |

OTHER PUBLICATIONS

English Language Abstract JP 3133297.

* cited by examiner

Primary Examiner—Wing Fu Chan
(74) Attorney, Agent, or Firm—Greenblum & Bernstein, P.L.C.

(57) ABSTRACT

If any of the communication terminals has incoming calls, calling signals are repeatedly output to the communication terminal at predetermined intervals until the communication terminal answers. When one communication terminal is called before another communication terminal answers its preceding call, calling signals to each communication terminal are repeatedly output alternately. Thus, a simple structure that is capable of changing output destinations for very calling signal output is provided. Upon receiving multiple incoming calls at about the same time, the apparatus can repeatedly output calling signals to corresponding communication terminals, without having multiple calling signal output apparatuses.

5 Claims, 5 Drawing Sheets

INTERNET COMMUNICATION CONTROL APPARATUS AND COMMUNICATION TERMINAL CALLING METHOD

BACKGROUND OF THE INVENTION

1. Field of the Invention

The present invention relates to an Internet communication control apparatus and communication terminal calling method that perform communication of Internet phones and facsimiles via networks and the Internet, using ordinal telephones and facsimile apparatuses.

2. Description of Related Art

Recently, with the widespread of the Internet use, various forms of devices that use the Internet, such as Internet phones and Internet facsimiles, have become available. For example, in the Japanese Patent No. 3133297, which has the same applicant for this application, a communication control apparatus has been proposed, which can perform Internet phone and facsimile communication connecting to analog communication terminals such as ordinal telephones and facsimiles.

According to such an apparatus, an ordinal telephone conversation is converted from analog to digital and transmitted to an Internet phone of the other side, using Internet phone protocols. Also, data scanned by a facsimile is attached to e-mail, by converting the data into a TIFF file, and transmitted to an Internet facsimile apparatus of the other side.

In response to an incoming call from the other side, the apparatus determines whether it is of a telephone or facsimile according to the protocols, chooses a communication terminal that is connected to the communication control apparatus according to the types of call, and outputs calling (incoming call) signals to the communication terminal.

The above-described patent mentions steps to establish communication without any overlap of time; however, it does not mention steps to establish simultaneous communication and such a development of configuration has been needed.

For such communication control apparatuses, a suggestion may be easily made to change data into packets and to transmit/receive the same via the Internet, so that after the communication is established, simultaneous phone conversations or facsimile communication can be established within the range that the conversations and facsimile data are not interrupted.

For example, in the above-described patent, an example to connect two communication terminals is disclosed. In that case, after the communication is established, packets are developed to be divided into communication terminals and to output the data to interfaces set in each communication terminal. In such an interface, an FIFO memory and AD/DA converter are equipped so that conversations and facsimile data are not interrupted.

However, to process data when the telephone and facsimile apparatus that are connected to the communication control apparatus have incoming calls from multiple callers at about the same time, with an overlap of time, the apparatus needs to repeatedly output calling signals to the communication terminals at predetermined intervals. Since the process is different, the above-described process after establishing the communication cannot be applied to the situation. Thus, a separate calling signal output apparatus needs to be established.

As a calling signal output apparatus, data may be processed in a parallel configuration, by enabling the communication terminals to output calling signals. However, the apparatus becomes very complicated and the cost rises. Each communication terminal may be provided with a calling signal output apparatus. However, the wiring becomes complicated in that case as well, and the device becomes upsized, while raising the cost similarly to the above.

SUMMARY OF THE INVENTION

This invention is provided in view of above-described problem in prior art. The main object of the invention is provide an Internet communication control apparatus and communication terminal calling method that can easily perform individual calling process, without complicating or upsizing the apparatus, when connected telephones and facsimile apparatuses have incoming calls from multiple parties about the same time with an overlapping of time.

To achieve the above-described object, the present invention is provided with an Internet communication control apparatus, to which multiple communication terminals, such as facsimile apparatuses and/or telephones, are connected, that is also connected to the Internet and can transmit/receive data between the connected communication terminals and other communication terminals via the Internet. The apparatus is provided with a calling signal output unit that repeatedly outputs calling signals to the communication terminal at predetermined intervals, when any of the connected communication terminals has an incoming call. When one communication terminal is called before another communication terminal answers its preceding call, the calling signal output unit outputs calling signals to the second communication terminal, between the calling signals to the first communication terminal.

For example, in case of two communication terminals, the apparatus repeatedly outputs calling signals alternately. In case of three or more terminals, the apparatus repeatedly outputs calling signals in the order.

Normally, calling signals are output intermittently. Therefore, by performing a calling signal output process for another communication terminal, between one calling signal and the next, a simple structure that is capable of changing output destinations for every calling signal output is provided. Also, upon receiving multiple incoming calls at about the same time, the apparatus can repeatedly output calling signals to corresponding communication terminals, without having multiple calling signal output apparatuses.

Also, to achieve the above-described object, the present invention is provided with a communication terminal calling method for the Internet communication control apparatus, to which multiple communication terminals such as facsimile apparatuses and/or telephones are connected, that is also connected to the Internet and can transmit/receive data with other communication terminals by converting the transmission request from each of the communication terminal via the Internet. If any of the communication terminals has incoming calls, calling signals are repeatedly output to the communication terminal at predetermined intervals until the communication terminal answers. When one communication terminal is called before another communication terminal answers its preceding call, calling signals are output to the second communication terminal, between the calling signals to the first communication terminal.

Also, when any of the communication terminals that have incoming calls answers, calling signals to other communication terminals are continued to be output.

BRIEF DESCRIPTION OF THE DRAWINGS

The present invention is further described in the detailed description which follows, with reference to the noted plurality of drawings by way of non-limiting examples of exemplary embodiments of the present invention, in which like reference numerals represent similar parts throughout the several views of the drawings, and wherein.

DETAILED DESCRIPTION OF PREFERRED EMBODIMENTS

The embodiment of the present invention is explained in the following, in reference to the above-described drawings.

Figure 1:
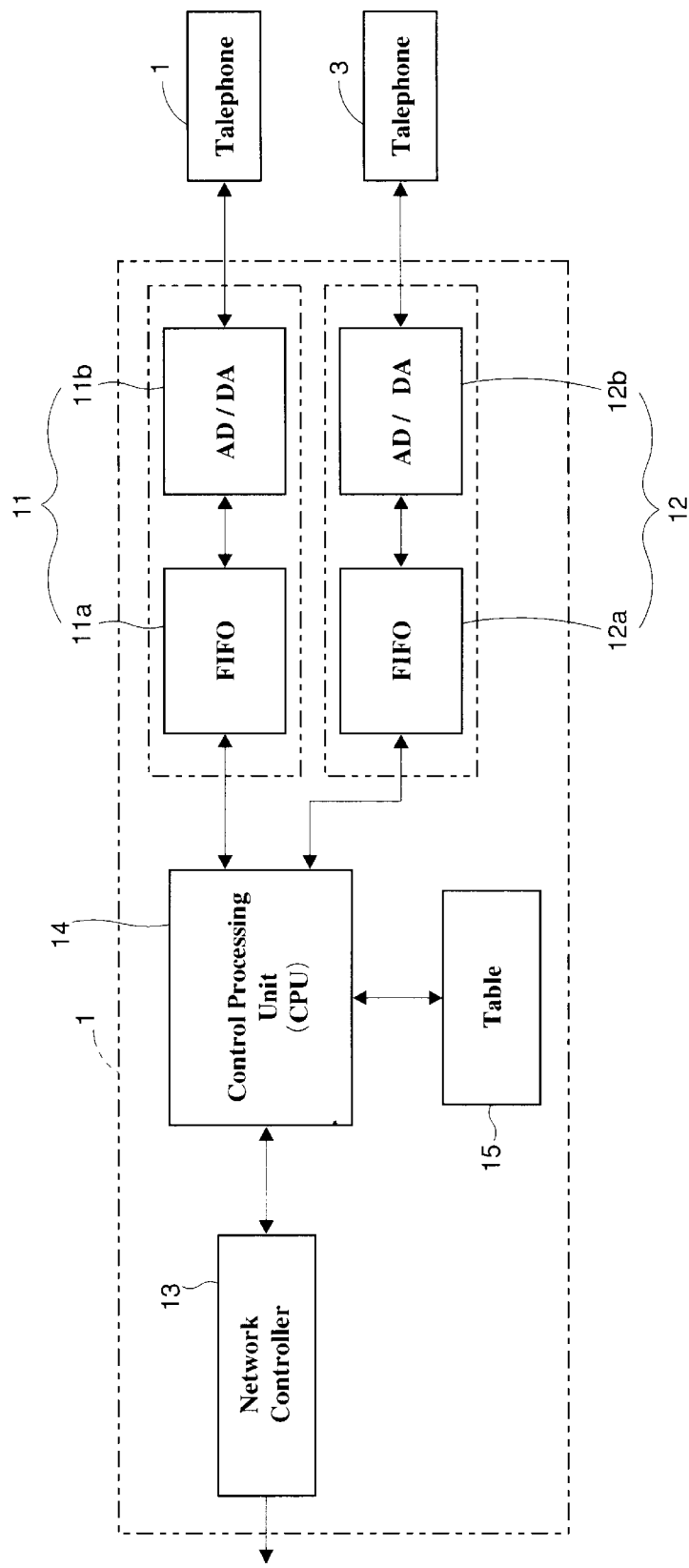
FIG. 1 is a block diagram illustrating a configuration of an Internet communication control apparatus according to the present invention.

FIG. 1 is a block diagram illustrating a configuration of the Internet communication control apparatus according to the present invention. A communication control apparatus 1 is provided with two terminal interfaces 11 and 12 that are connected to communication terminals 2 and 3, which are telephones or facsimiles; a network controller 13 that are connected to the Internet via a router, such as LAN; a central processing unit (CPU) 14 that analyzes transmission requests from the communication terminals 2 and 3, changes the data into packets, performs data transmission via the network controller 13, receives data via the network controller 13, and transmits the receiving data to the corresponding communication terminal 2 or 3; and a table 15 that converts phone numbers and/or abbreviated dial numbers into IP addresses or mail addresses, from the transmission requests of the communication terminals 2 and 3. In this configuration, both of the communication terminals 2 and 3 are telephones.

The terminal interfaces 11 and 12 comprises AD/DA converters 11a and 12a, and FIFO memory 11b and 12b.

Figure 2:
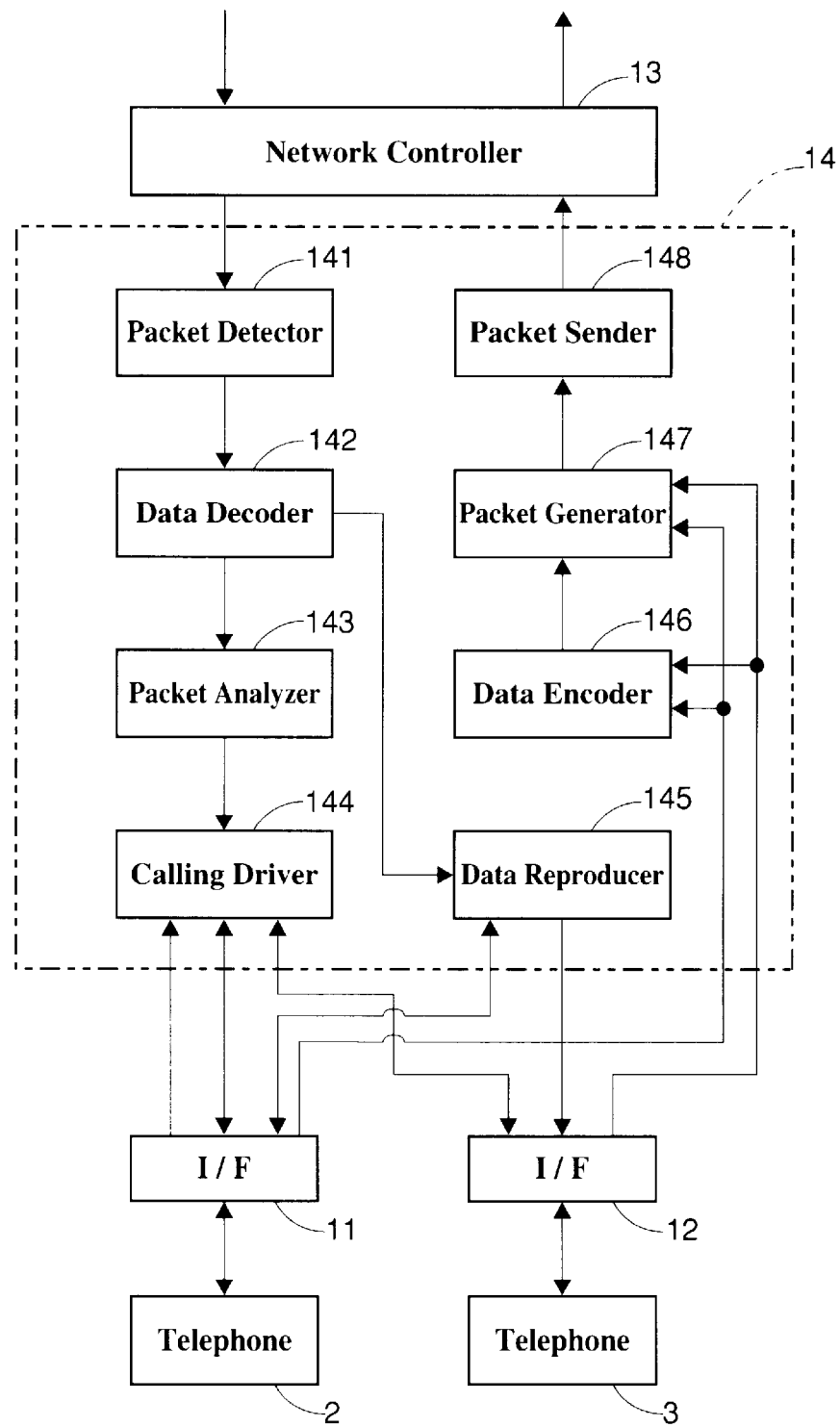
FIG. 2 is a block diagram illustrating a configuration of a central processing unit (CPU) 14.

FIG. 2 is a block diagram illustrating a configuration of the central processing unit (CPU) 14. A packet detector 141 that is connected to the network controller 13 is connected to a packet analyzer 143 via a data decoder 142. The data decoder 142 groups the data divided into multiple packets and restores it into original data. For a voice packet that is compressed/converted for packet transmission, the data decoder 142 restores the packet into voice data to be replayed. The packet analyzer 143 analyzes the restored data. When calling requests are detected from the receiving packet, the terminal interface 11 outputs a calling signal to the communication terminals 2 and the terminal interface 12 outputs a calling signal to the communication terminal 3 (ring initiation process) in a later described steps via a calling driver 144, as a calling signal output unit, and a ringer is turned on, i.e., a ring is initiated. If a communication is established, data input from the data decoder 142 and packet analyzer 143 is restored into voice digital data to be replayed with a data reproducer 145, so that the terminal interfaces 11 and 12 can convert the data into analog data and output to the communication terminals 2 and 3 respectively.

If there is a transmission request from the communication terminals 2 and 3, on the other hand, a data encoder 146 compresses and converts the voice digital data for the packet transmission according to a protocol such as G. 729. A packet generator 147 generates a packet, so that the generated packet can be transmitted via a packet sender 148 and network controller 13.

Figure 3:
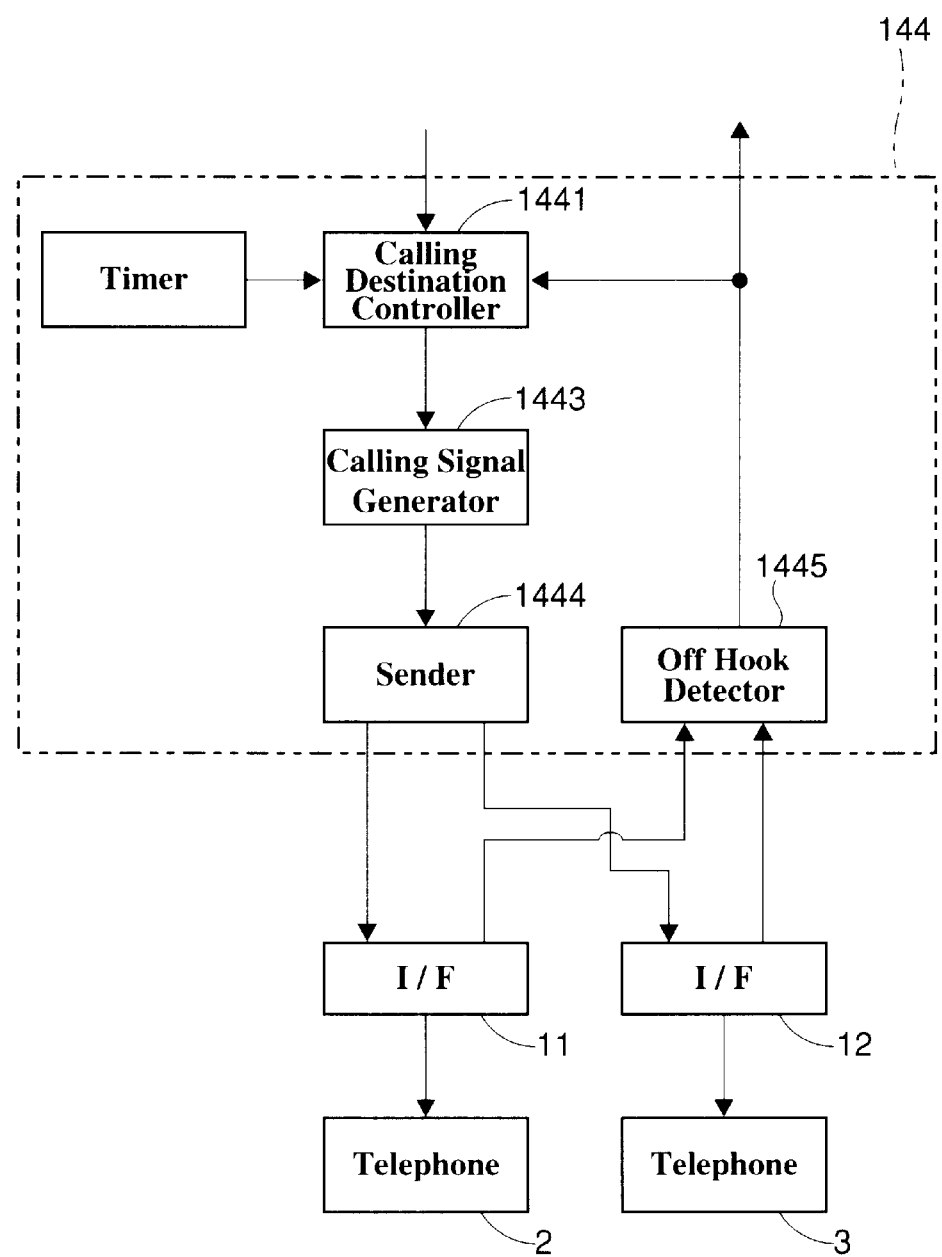
FIG. 3 is a block diagram illustrating a configuration of a calling driver 144.

FIG. 3 is a bock diagram illustrating a configuration of the calling driver 144. A calling destination controller 1441 is connected to the data decoder 142 and packet analyzer 143. The calling destination controller 1441 analyzes data designating communication terminals in a control packet and selects a communication terminal. In this embodiment, two communication terminals i.e., a telephone and facsimile are connected. If three or more communication terminals are connected, a waiting line is generated in the order of calling requests, and the communication terminals will ring in the order, i.e., first, second and third. Upon receiving an incoming call, the calling destination controller 1441 determines whether the calling destination from the other side is for the communication terminal 2 of the terminal interface 11, or for the communication terminal 3 of the terminal interface 12. Then a calling signal generator 1443 generates a calling signal so that the calling signal generated via a sender 1444 is selectively transmitted to either the terminal interfaces 11 and 12, i.e., the communication terminals 2 and 3. The length of the calling signal is set to 2 seconds, for example, and it is set by a timer 1442.

When the corresponding communication terminal 2 or 3 answers, an off hook detector 1445 detects it and stops generating/transmitting (outputting) the calling signal. When the call from the other side also stops, the off hook detector 1445 stops generating/transmitting (outputting) the calling signal. In addition, when the call from the other side stops, the corresponding packet is transmitted. Upon detecting the packet, generating/transmitting the calling signal is stopped.

Figure 4:
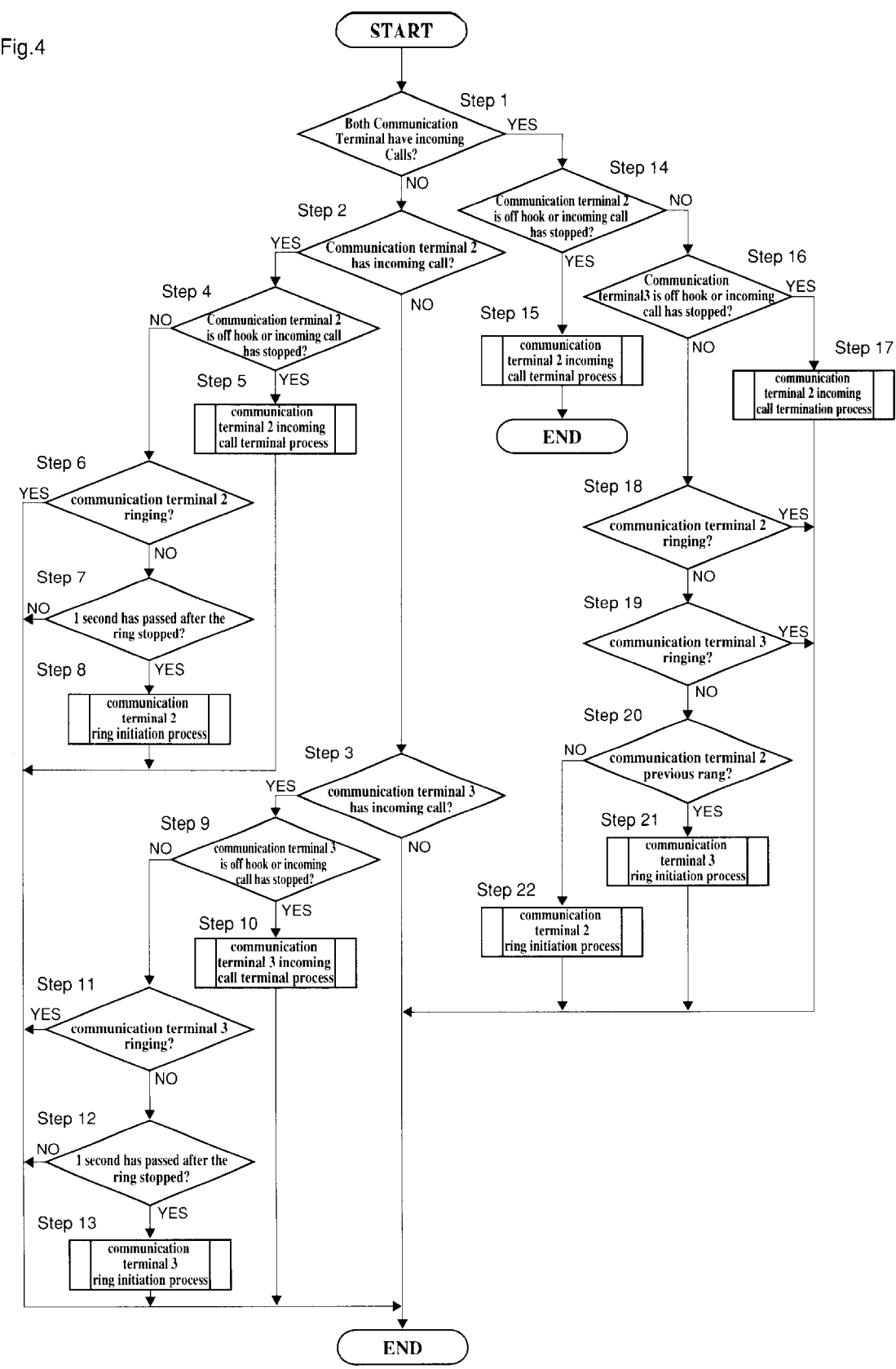
FIG. 4 is a flowchart of a calling process by the Internet communication control apparatus according to the present invention.

FIG. 4 is a flowchart when incoming calls from one or two parties have been received. First, Steps 1, 2, and 3 check whether both of the communication terminals 2 and 3 have separate incoming calls, whether either one of the communication terminals 2 or 3 has incoming calls, or whether there is no incoming call. When there is a calling request only to the communication terminal 2, the control moves from Step 2 to Step 4 to check whether the communication terminal 2 has already answered the call, that is, off the hook, or whether the calling request to the communication terminal 2 has stopped. If the communication terminal 2 is off the hook or the calling request to the communication terminal 2 has stopped, a calling request termination process for the communication terminal 2 is performed at Step 5, and the flow ends.

If the communication terminal 2 is not off the hook at Step 4, and the calling request to the communication terminal 2 has not stopped, the control proceeds to Step 6 to check whether the ringer of the communication terminal 2 is on, i.e., whether it is ringing. If it is ringing, the flow ends as is. If it is not ringing, the control moves to Step 7 to check whether 1 second has passed after the ringing stopped. If 1 second has passed after the ringing stopped, the control proceeds to Step 8 to perform the ring initiation process, and the flow ends. If 1 second has not passed after the ringing stopped, the flow ends as is.

Next, when there is a calling request only to the communication terminal 3, the control proceeds from Step 3 to Step 9 to check whether the communication terminal 3 is off the hook or the calling request to the communication terminal 3 has stopped. If the communication terminal 3 is already off the hook or the calling request to the communication terminal 3 has stopped, a calling request termination process for the communication terminal 3 is performed at Step 10, and the flow ends.

If the communication terminal 3 is not off the hook at Step 9, and the calling request to the communication terminal 3 has not stopped, the control proceeds to Step 11 to check whether the ringer of the communication terminal 3 is on, i.e., whether it is ringing. If it is ringing, the flow ends as is. If it is not ringing, the control proceeds to Step 12 to check whether 1 second has passed after the ringing stopped. If 1 second has passed after the ringing stopped, the control proceeds to Step 13 to perform the ring initiation process, and the flow ends. If 1 second has not passed after the ringing stopped, the flow ends as is.

If there are calling requests to both the communication terminals 2 and 3, the control proceeds from Step 1 to Step 14. In Steps 14–17, the control checks whether the communication terminal 2 or communication terminal 3 is off the hook, or the calling requests have stopped. If the communication terminal 2 or communication terminal 3 is off the hook, or the calling requests have stopped, a calling request termination process is performed and the flow ends.

If both the communication terminals 2 and 3 are not off the hook, and the calling request to the communication terminal 2 has not stopped, the control proceeds to Step 18 to check whether the communication terminal 2 is ringing. If it is ringing, the flow ends. If the communication terminal 2 is not ringing at Step 18, the control proceeds to Step 19 to check whether the communication terminal 3 is ringing. If it is ringing, the flow ends as is. If the communication terminal 3 is also not ringing at Step 19, the control proceeds to Step 20 to check whether the last ring was from the communication terminal 2 or communication terminal 3. If the last ring is from the communication terminal 2, the control proceeds to Step 21 to perform a ring initiation process for the communication terminal 3. If the last ring is from the communication terminal 3, the control proceeds to Step 22 to perform a ring initiation process for the communication terminal 2, and the flow ends.

The above-described flow is repeated at short intervals. Therefore, if there is a calling request only to the communication terminal 2, processes for Steps 1, 2, 4, and 6–8 are repeated and the communication terminal 2 rings at predetermined intervals. If there is a calling request only to the communication terminal 3, processes for Steps 1–3, 9, and 11–13 are repeated and the communication terminal 3 rings at predetermined intervals.

If there are calling requests for communication terminals 2 and 3 with an overlap of time, and as long as they continue, the processes for Steps 1, 14, 16, and 18–22 are repeated and the communication terminals 2 and 3 ring alternately. If one of the communication terminals 2 and 3 is off the hook, or a calling request has stopped, the control performs processes of Steps 1, 2, 4, and 6–8, or a process of Steps 1–3, 9, and 11–13.

Figure 5:
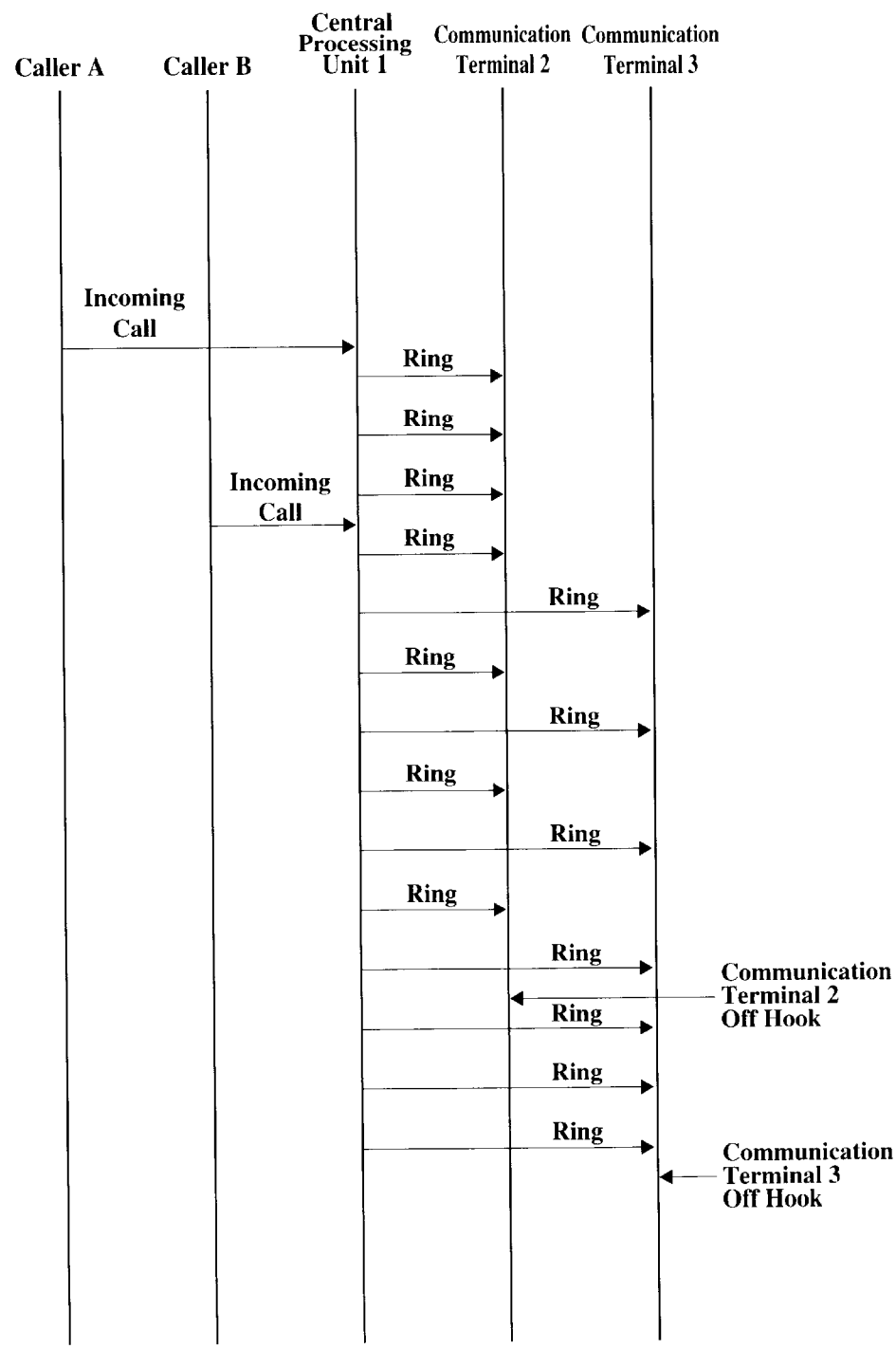
FIG. 5 is a sequence chart of the calling process by the Internet communication control apparatus according to the present invention.

FIG. 5 illustrates a flow of signals, when a first calling request is made to the communication terminal 2, then to the communication terminal 3, and the communication terminal 2 becomes off the hook during a calling request is continuing to the communication terminal 3.

First, the communication terminal 2 rings for 2 seconds, and pauses for 1 second. When there is a calling request to the communication terminal 3, the communication terminals 2 and 3 ring alternately. When the communication terminal 2 becomes off the hook, the communication terminal 3 rings for 2 seconds, and pauses for 1 second.

Additionally, there are two communication terminals in this embodiment; however, with three or more communication terminals connected, those communication terminals can similarly ring repeatedly in the order.

The present invention is not limited to the above-described embodiments, and various variations and modifications may be possible without departing from the scope of the present invention.

This application is based on the Japanese Patent Application No. 2001-198437 filed on Jun. 29, 2001, entire content of which is expressly incorporated by reference herein.

What is claimed is:

1. An Internet communication control apparatus selectively connected to a plurality of communication terminals and to a computer network, said Internet communication control apparatus comprising:

a controller configured to transmit calling signals to said plurality of communication terminals, wherein a single calling signal having a first predetermined time period is transmitted to one communication terminal of said plurality of communication terminals when a single calling request is detected from the computer network, and wherein plural calling signals having a second predetermined time period are sequentially transmitted to plural communication terminals of said plurality of communication terminals when plural calling requests are detected from the computer network, said plural calling signals being transmitted one after another to the plural communication terminals.

2. The Internet communication control apparatus according to claim 1, further comprising a memory that stores a telephone number and a destination address on the computer network corresponding to the telephone number;

said controller retrieving said destination address corresponding to the telephone number from said memory and transmits data to the retrieved destination address via the computer network when said controller receives a transmission request to a destination designated by the telephone number from the communication terminal.

3. The Internet communication control apparatus according to claim 1, wherein at least one of said plurality of communication terminals is a telephone apparatus.

4. The Internet communication control apparatus according to claim 1, at least one of said plurality of the communication terminals is a facsimile apparatus.

5. A communication control method for controlling an Internet communication control apparatus selectively connected to a plurality of communication terminals and to a computer network, the communication control method comprising:

transmitting a single calling signal having a first predetermined time period to one communication terminal of the plurality of communication terminals when a single calling request is detected from the computer network; and sequentially transmitting plural calling signals having a second predetermined time period to plural communication terminals of the plurality of communication terminals when plural calling requests are detected from the computer network, the plural calling signals being transmitted one after another to the plural communication terminals.

* * * * *

UNITED STATES PATENT AND TRADEMARK OFFICE
CERTIFICATE OF CORRECTION

PATENT NO. : 6,687,343 B2
DATED : February 3, 2004
INVENTOR(S) : Y. Takemoto

It is certified that error appears in the above-identified patent and that said Letters Patent is hereby corrected as shown below:

<u>Title page,</u>
Item [57], ABSTRACT,
Line 10, "very" should be -- every --.

Signed and Sealed this

Third Day of May, 2005

JON W. DUDAS
*Director of the United States Patent and Trademark Office*